METHOD OF MAKING A MEMORY DEVICE COMPONENT AND THE LIKE

Filed Sept. 20, 1965 3 Sheets-Sheet 1

INVENTORS
David H. Navon,
David Bakalar
Wolf, Greenfield + Hieken

METHOD OF MAKING A MEMORY DEVICE COMPONENT AND THE LIKE

Filed Sept. 20, 1965

INVENTORS
David H. Navon,
David Bakalar
Wolf, Greenfield + Hieken
ATTORNEYS

INVENTORS
David H. Navon,
David Bakalar
Wolf, Greenfield + Hieken
ATTORNEYS 3,404,452

METHOD OF MAKING A MEMORY DEVICE COMPONENT AND THE LIKE

David H. Navon, Lincoln, and David Bakalar, Boston, Mass. (both of 168–182 Albion St., Wakefield, Mass. 01880)

Filed Sept. 20, 1965, Ser. No. 488,611
7 Claims. (Cl. 29—604)

ABSTRACT OF THE DISCLOSURE

A method of making a thin film capacitive fixed memory array having sensing lines and address lines which form a plurality of crossover points in the device and in which the dielectric material forming the capacitor crossover points is of varying thickness. A large sheet of dielectric material having a plurality of selected locations corresponding to the crossover points of the memory device to be made is magnetically marked with ink at those points which are to have minimum capacitance. A dielectric board with beveled holes corresponding to the crossover points is positioned over the marked sheet and a plurality of magnets shaped to fit into the beveled holes is placed on the dielectric board and the board is shaken so that the magnets fall into and are retained in those holes which are above the magnetically marked points on the sheet. The pattern formed by the dielectric board is then photographically copied and reduced in size. A base layer of a dielectric material having a set of elongated conductive members covered by a dielectric of uniform thickness and photoresist material is then exposed to light through the reduced pattern, and the developed area of the photoresist material is reduced. Thereafter a second set of elongated conductive members are formed angularly to the first mentioned conductive members and crossing the first with the two angularly arranged sets of conductive members variably spaced depending upon the amount of dielectric material which has been removed.

The present invention relates to a method of making a memory array, and in particular to thin film, capacitive fixed memory arrays.

Capacitive fixed memory arrays are ordinarily formed of a matrix of memory elements positioned so that the elements may be addressed by one plurality and sensed by another plurality of parallel connections. The individual memory elements are formed by crossover points in the address and sensing lines of the array to form a selection of binary words or digits which are stored in rows or columns of the matrix array. The particular binary digit is determined by the presence or absence of a capacitive coupling at the crossover points of the address and sensing lines. One form of these memory systems comprise capacitance elements formed by enlarged metal portions of the addressing and sensing lines, and is illustrated in United States Letters Patent 3,183,490 issued May 11, 1965, to J. F. Cubbage. Another and improved form of a capacitive fixed memory matrix or system is illustrated in copending application entitled, "Memory Circuit," filed Aug. 6, 1965, Ser. No. 477,849, in which variations in the dielectric thickness between the address and the sensing lines at the crossover points determine variations in the capacitive coupling between the address and sensing lines.

There is a significant need for substantial numbers of such capacitive memory devices for use in computers and other comparable equipment. Heretofore, such capacitor fixed memory devices have been expensive and difficult to make and, apparently, have been impractical for a wide variety of uses because of the large number of specially tailored devices that are required for various applications. Methods heretofore practiced in making memory arrays of the type described in this application usually contemplate laborious individual formation of matrices with each matrix of substantial size and bulk.

It is an object of the present invention to provide a simple and inexpensive method of making fixed memory devices and, in particular, fixed memory devices of the thin film variety which are capable of storing thousands of bits of information by capacitive means in a binary system on very small matrix members.

A further object of this invention is to provide an improved method of forming fixed matrices tailored to individual variable orders on a relatively inexpensive and efficient basis.

A further object of this invention is to provide an efficient method of making memory devices using reusable masters tailored to facilitate fabrication of the devices.

It is also an object of this invention to provide a method of transferring thousands of bits of information in a memory matrix from the customer to the memory manufacturer, simply, inexpensively, and expeditiously.

It is also an object of this invention to provide means by which many thousands of bits of information in a memory matrix can be marked "1" or "0" in a few minutes on a special card, inexpensively, and then relayed to the memory manufacturer for immediate and rapid translation into a capacitor read-only type memory.

The present invention provides an improved method by which data or information may be permanently stored on a permanent memory device of the thin film variety, very inexpensively and efficiently. Data to be memorialized for use in computer or data storage and retrieval system, is marked on a card having a plurality of rows and columns forming a plurality of crossover areas or rectangles that correspond to a lattice network formed by address and sense lines of a memory device. The card is marked (preferably with magnetic ink) or left unmarked, at the appropriate rectangles to indicate maximum and minimum capacitance coupling. This variation in capacitance coupling corresponds to the location of 0's and 1's in a binary digit system of a memory device (see U.S. Patent 3,183,490 issued May 11, 1965). This card may then be mated to a thin dielectric board having a plurality of apertures arranged in rows and columns and corresponding to the crossover areas of the lattice referred to above. The marked and unmarked intersections will show through these cards. A plurality of small magnets placed on the board are agitated so that they fall into the holes in the dielectric board. Those magnets which fall into holes over the magnetic ink markings are held relatively securely in place; the other magnets, whether resting loosely on the board or in holes not overlying magnetic ink markings, are thereafter removed. The dielectric board having magnets in selected holes corresponding to the marked holes is then photographically transferred and reduced onto a plate preferably formed of glass and having a photoemulsion layer on its surface. A mask is thereby formed on the plate with a pattern consisting of the negative of the magnetically marked cards. This mask is then positioned over a partially formed memory device. This partially formed memory device comprises an integral member formed with a base layer of dielectric material, and a plurality of elongated conductive members on the base layer are adapted to form either the address or sense lines of the memory device. A dielectric means of uniform thickness covers the conductive members and the surface of the base layer that is supporting the conductive members. A layer of photoresist material covers the dielectric means and forms the top surface of this member. Light projected through the pattern of the glass plate mask activates the photoresist material in a pattern that corresponds with the negative formed on the glass plate. After the photoresist material has been selectively activated, the exposed portions are removed by a suitable developer to expose the underlying dielectric means which in turn overlie sections or portions of the elongated conductive members. These exposed portions of the dielectric means are then thinned relative to the non-exposed portions of the dielectric means. Following this, a second set of conductive members is suitably deposited angular to the first, and overlying the dielectric means to form crossover points, with the crossover points having a greater capacitive coupling at the thin portion than at other portions.

These and other objects and advantages of the present invention will be more clearly understood when considered in conjunction with the accompanying drawings in which.

Figure 13:
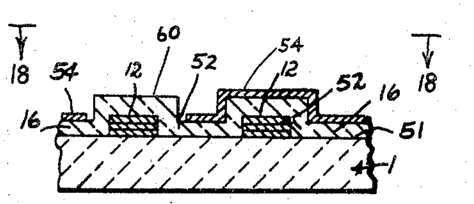
FIGS. 13, 14, 15, 16 and 17 are illustrations of steps in the process, inseriatum subsequent to the step illustrated in FIG. 12.
Figure 15:
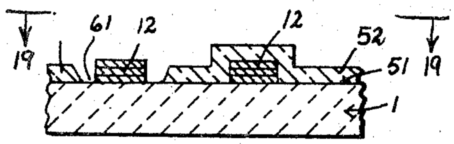
Figure 21:
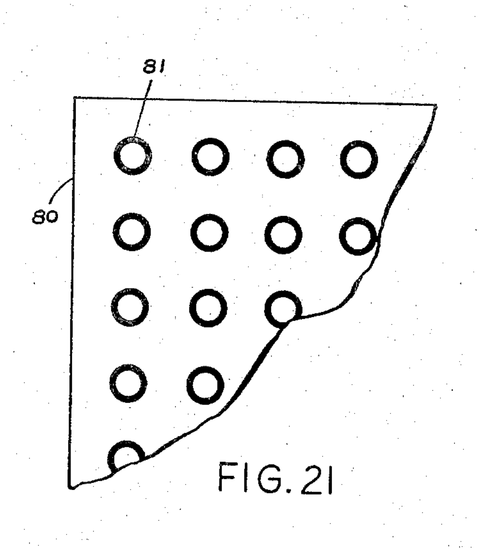
Figure 22:
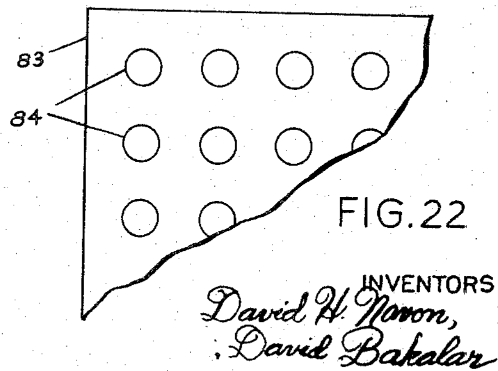
Figure 16:
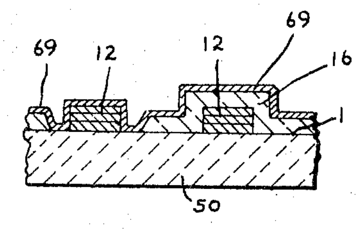
Figure 17:
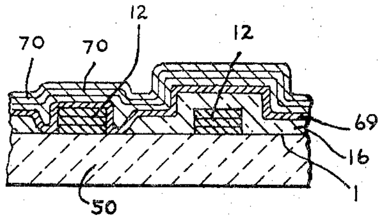
Figure 18:
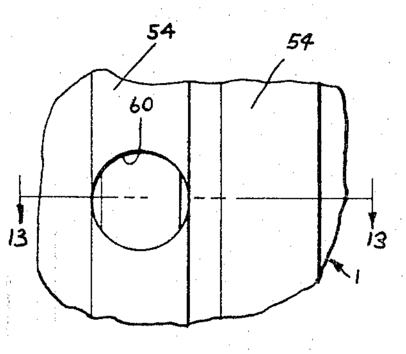
Figure 19:
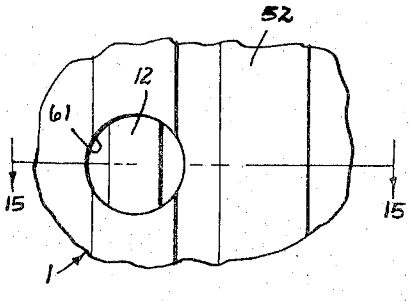
Figure 20:
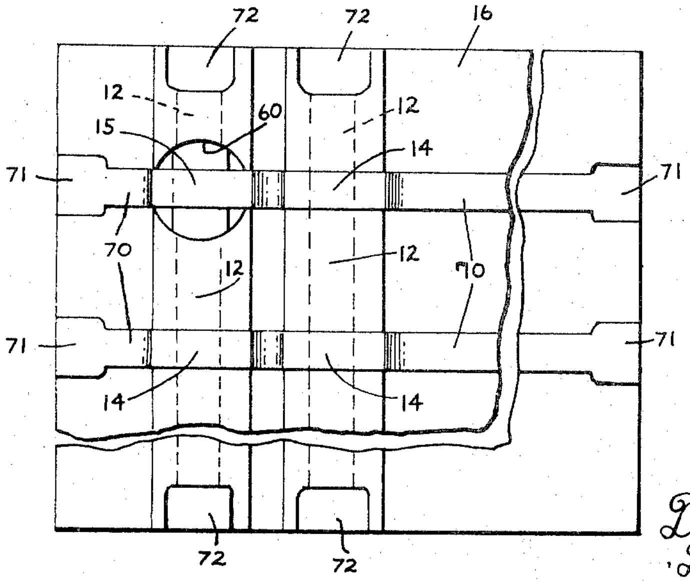

FIGS. 18 and 19 are plan views respectively corresponding to FIGS. 13 and 15, as indicated respectively by the lines 18—18 and 19—19;

FIG. 20 is a fragmentary top plan view of a memory device made in accordance with the present invention; and FIG. 21 and FIG. 22 are components used in a modification of this invention.

The memory devices made in accordance with this invention are preferably capacitive read-only, permanent memory, thin film devices. Such devices are of the type shown in copending application entitled "Memory Circuit," and illustrated in FIG. 20. In this arrangement, the memory matrix is formed with a plurality of address lines 70, extending preferably parallel to one another, and sense lines 12 which also extend parallel to one another but angular to the address lines. The intersections of the address and sense lines form a plurality of crossover points 14 and 15. The address and sense lines are closer together at the crossover points 15 than at the other crossover points 14 and, therefore, have a greater capacitance coupling at the crossover points 15 than at the crossover points 14. This variation provides a binary system, in which the binary digits are stored in rows or columns of the linear selection matrix array. This memory array, therefore, may be read by addressing an entire column or row of storage elements simultaneously and detecting the binary 1's and 0's in the respective bit positions of the stored binary digit or word. Thus, it is the presence or absence of capacitive coupling between a sense and address conductors that determine the existence of binary 1 or a 0. Variation of capacitive coupling may be obtained by making the thickness of the intermediate dielectric means 16 less at the crossover points 15 than at the crossover points 14.

Memory devices of the type described in FIG. 20 and other similar permanent memory devices, may be made on a commercial basis tailored to specific needs utilizing the method illustrated in FIGS. 1 to 19. In this method, a plurality of uniform dimensioned cards 18 of any suitable dielectric material are uniformly imprinted with intersecting spaced rows 19 and columns 20 forming a plurality of spaced rectangles arranged in a lattice or grid corresponding to the crossover points in the memory matrix being formed. Preferably these cards are light in color, such as white, and the rectangles or crossover areas 22 are dark in color, such as black or grey. Each rectangle represents a binary 0 or binary 1 location. Preferably these cards should be conveniently sized to permit and facilitate marking by the user with a white colored magnetic ink or the like. For example, these cards may have a length of 10 inches and a height of 10 inches and be divided into a matrix of one hundred rows and one hundred columns, each spaced apart $\frac{1}{20}''$ and each having a width of $\frac{1}{20}''$, to provide a card having 10,000 crossover rectangles. the card also should be sufficiently rigid and durable to permit the subsequent positioning and aligning of the card using its side edges as a guide, with out the likelihood of variations in alignment due to wear or inaccuracies in the card.

The card is magnetically marked with suitable means to distinguish or identify binary 0 from binary 1 crossover areas or rectangles. This marking may be made by lightening in color the binary 0 crossover rectangles preferably with a white magnetic ink, as illustrated at 22A. The remaining black colored crossover rectangles in the rows and columns are left unmarked and, thereby, represent and correspond to the locations of the binary 1's that are to be formed in the memory matrix.

Figure 1:
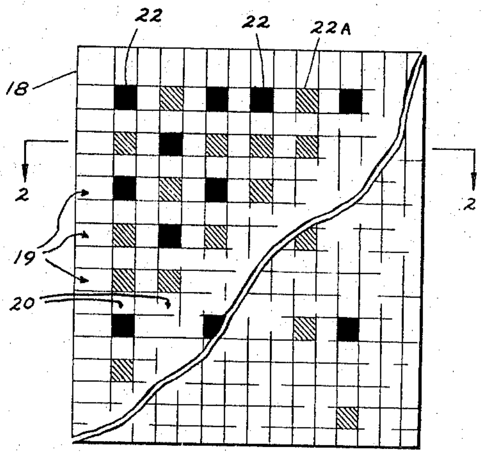
FIG. 1 is a plan view of a card used in the practicing of the invention.
Figure 3:
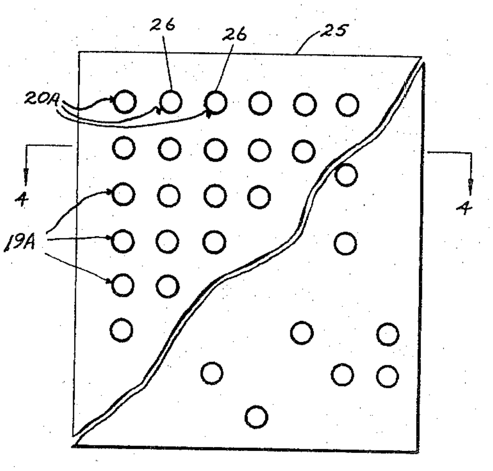
FIG. 3 is a plan view of a board used in an intermediate step in practicing of the invention.

To transfer the information on a card 18 to a memory matrix, the card is placed adjacent to a board 25, illustrated in FIG. 3. This board is preferably thin and is formed of an opaque, dark colored, dielectric material such as an epoxy. The board has a length and width dimension corresponding to those of the cards 18. Its thickness should preferably be in an order of magnitude less than the width or height of the crossover areas or rectangles formed by the rows and columns 19 and 20 on the card 18. The board 25 has sufficient rigidity to be self-supporting forming an integral uniplanar surface. A plurality of apertures or holes 26 through the board and arranged in rows 19A and columns 20A, correspond respectively in relative location to the crossover areas or rectangles formed by the rows and columns 19 and 20 of the cards 18. When the board 25 is arranged adjacent or in facing relation to a card 18, a hole 26 will be vertically aligned with each crossover area or rectangle of the card 18.

Figure 10:
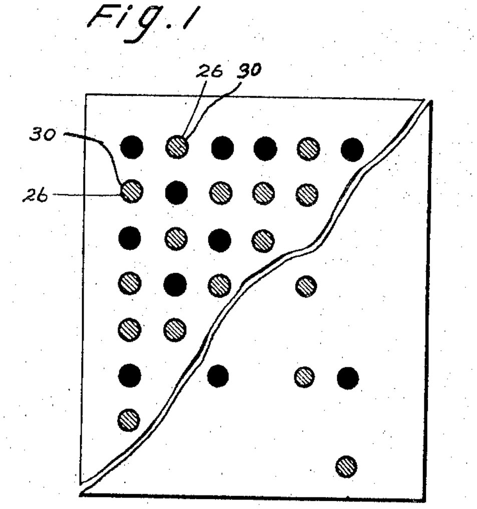
FIG. 10 is a top plan view of the board of FIG. 3 after magnets have been properly located.
Figure 2:
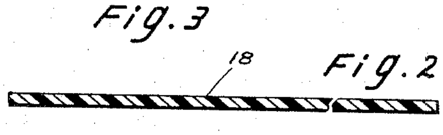
FIG. 2 is a cross-section of the card shown in FIG. 1 and taken along the line 2—2 of FIG. 1.
Figure 6:
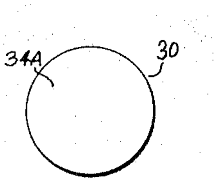
FIG. 6 is a top plan view of the magnet shown in FIG. 5.
Figure 8:
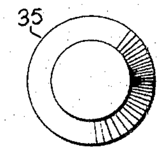
FIG. 8 is a top plan view of the magnet shown in FIG. 7.
Figure 5:
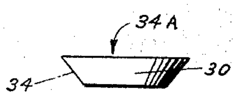
FIG. 5 is a side elevational view of the magnet used in the present invention.
Figure 7:
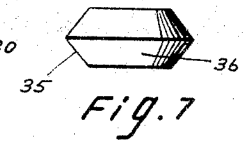
FIG. 7 is a modification of the magnet shown in FIG. 5.
Figure 4:
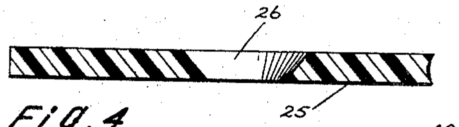
FIG. 4 is a fragmentary cross-sectional view of an enlarged scale of the board shown in FIG. 3 with the cross-section taken along the line 4—4.
Figure 9:
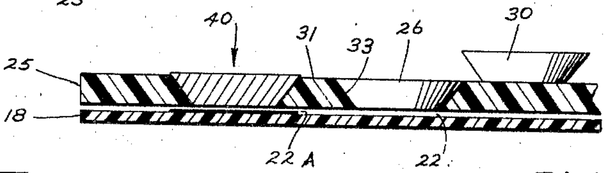
FIG. 9 is a cross-sectional view on an enlarged scale showing the card of FIG. 1 and board of FIG. 3 in juxtaposition in a subsequent step in practicing the invention.
Figure 11:
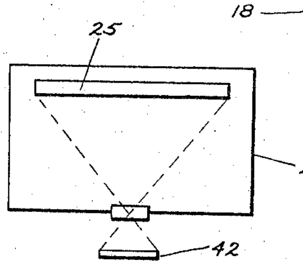
FIG. 11 is a schematic view showing photographic transfer and reduction of the pattern formed on the board of FIG. 2 to a photographic plate.

The card 18 bearing information which is to be translated onto a permanent memory device, is aligned in facing relation with a board 25 in the manner illustrated in FIG. 9. Both the marked crossover areas 22A having a light color, and the unmarked crossover areas 22 having a dark color, underlie and show through apertures 26. A plurality of light colored, preferably white, magnets 30 are then positioned on the upper surface 31 of the board 25. A sufficient number of these white colored magnets should be placed on the surface 31 to fill all of the holes. These magnets are shaped to fit into the holes 26 which preferably are beveled as illustrated at 33. The magnets are preferably shaped as illustrated in FIGS. 5 and 6, and are formed as a truncated cone. An alternate embodiment of the magnets as illustrated in FIGS. 7 and 8 in which the magnets are formed as a double truncated cone, having an upper to lower surface thickness of approximately twice that of the width of the board 25. The walls 34 of the magnet 30 and 35 of the magnet 36 are formed at an angle substantially equal to those formed by the beveled sides of the holes 26. Preferably, the diameter on the largest surface 34A of magnets 30 is slightly greater than the diameter at the upper end of holes 26 to insure that the magnets will fall into the holes only in proper orientation. A quantity of magnets 30 are placed on top of the board 25 while the board 25 is secured directly above and in facing relation to card 18. The board 25 and card 18 are agitated or vibrated rapidly by suitable means to cause the magnets 30 to slide across the upper surface 31 of the board 25 and fall into the holes 26, as illustrated at 40. When the holes 26 have been filled by magnets, the card 18 and board 25 while still secured in facing relation to one another, are inverted and all magnets 30 not properly seated in holes 26 and all magnets 30 that are in holes 26 not overlying a magnetically marked crossover area as illustrated at 22, are shaken or dropped here. The card 18 and board 25 are then turned over again so that the board 25 is uppermost. The board 25 is visually checked to make sure that all holes over magnetically marked crossover areas 22 are filled with magnets. At this point the dark board 25 has a plurality of light colored magnets located at those crossover areas in which maximum capacitance is desired. While the remaining holes are dark, the board 25 is then carefully separated from the card 18 without disturbing the magnets then remaining in the holes 26 (FIG. 10). The board 25 containing the selectively located magnets 30, is then photographed onto a glass photoemulsion plate 42 by a conventional reduction camera 49. Preferably, the camera is at least a 10× reduction camera, and reduces the overall image dimensions from 10″ by 10″ to 1″ by 1″. A pattern which is the negative of the magnetically marked card 18, is thereby formed on the glass photoemulsion plate 42.

This glass photoemulsion plate is developed, and may thereafter be used to process previously made blank stock components into individually tailored memory devices conforming to the marked cards 18. These stock components comprise partially finished matrices which have been previously prepared on a mass-production basis to the point at which individual tailoring for specific memory arrangements is desired. A stock component 1 shown in cross-section in FIG. 12, consists of a base layer 50 of a ceramic wafer. This base layer may have a width and length dimension of 1″ by 1″, and a thickness of approximately .020-inch. A plurality of elongated conductive members 12, are positioned on the base layer of the ceramic wafer 50, and are spaced apart from each other a distance corresponding to the space between the rows photographically reproduced on the glass plate 42. Thus, for example, these conductive elements may be equally spaced lines or strips about .005-inch wide with a .010-inch center to center spacing. The strips or bands, preferably, cover the entire surface of the wafer 1, and have an overall thickness preferably in the order of about .001″. A dielectric material is formed over the entire surface 51 of the base 50 and strips 12 in a layer 52 of uniform thickness, as illustrated. This layer 52 is formed of a dielectric material such as silicon dioxide or ground glass or glass particles. A conventional photoresist material is formed as a film or layer 54 over the dielectric layer 52.

Figure 12:
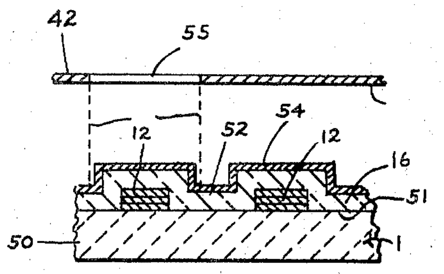
FIG. 12 is a cross-sectional elevation on an enlarged scale showing a step in the formation of a memory device using the photographic plate illustrated in FIG. 11.

To fabricate a component 1 into a permanent memory device, using the glass photoemulsion plate 42, a number of holes 60 are opened in the photoresist film 54. These holes correspond in location and size to the contrasting portions 55 corresponding to the magnetically marked portions of card 18, and formed in the glass photoemulsion plate 42. These portions 55 in turn correspond to the locations of the apertures 26. These holes 60 preferably have a diameter of .015″ with the hole centers aligned with the center lines of the metallic strips or bands so that the periphery of the holes 60 extend laterally beyond the side edges of the strips 12 over which they are opened. These holes are opened by any suitable well-known technique. For example, if plate 42 is a negative with portions 55 dark and the remaining transparent, a component 1 is used which has a photoresist film of the type that develops by exposing it to light. This film 54 is exposed to light through plate 42 except for the opaque portions 55, as illustrated in FIG. 12. After exposure to the light, the wafer is washed in a suitable solvent that will remove the undeveloped photoresist material but not the developed photoresist. This solution washes away the unexposed portion of the photoresist leaving holes 60.

Alternately, if a positive plate 42 is used in which portions 55 are transparent and the balance opaque, a component 1 having a photoresist film of the type which fixes on exposure to light is used. If such a photoresist material is used the developed or fixed portions of the photoresist material may be washed or etched away. This etch or wash removes the exposed portions of the photoresist material forming the holes 60 without affecting the remaining parts of the unit. The number, shape and size of the holes which are formed and their locations are determined by the parameters of the memory device being formed. Thus, for example, if a memory device having 500 bits of one characteristic is required, the mask may have a corresponding number of holes formed in it with these holes positioned on the mask in locations corresponding to the desired locations of the bits on the device being formed. The relative location of these holes in the mask is then transferred to the film and wafer in the manner herein described.

Figure 14:
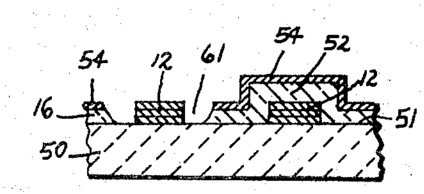

After the holes 60 have been opened in the photoresist film 5, the exposed portions of the layer 16 in the holes are removed by suitable means. This may comprise immersing the wafer in an etching bath consisting of an acid solution of a type commonly available for such purposes. When the exposed portions of the layer 16 have been removed, portions of certain bands or strips 12 are exposed as illustrated in FIG. 14, and in FIG. 15 at 61.

Following the removal of the exposed portions of the layer 16, the remainder of the photoresist film may be removed by suitable and known means. This may comprise immersing the wafer in a commonly available photoresist solvent. This step, while preferred, is optional. After removal of the remainder of the photoresist film, the partially processed device has a configuration as illustrated in FIG. 15.

After the removal of the photoresist film, a thin dielectric layer 69 is deposited over the entire surface of the wafer covering the layer 16 and the exposed portions of strips 12. This layer 69 is preferably formed of a silicon oxide and has a uniform thickness of preferably approximately .1 micron. This extremely thin layer forms a dielectric insulator which will separate the bands or strips 12 from subsequently formed cross-over bands or strips. The dielectric layer 69 may be deposited by any suitable known semiconductor technique for depositing materials such as silicon oxide.

After deposition of the dielectric layer 69, another group or series of bands or strips 70 are laid or deposited across the exposed surface of the dielectric layer 69 in a direction angular to the direction of the bands or strips 12. Prefereably, the bands or strips are laid or deposited at right angles to bands or strips 12 to form a lattice network type of arrangement. These bands or strips 70 may be deposited in the same manner and may be of the same dimensions and thickness as the bands or strips 12 deposited on the substrate 51. The strips 70 cross or intersect the strips 12 and form crossover points at the holes 60 and elsewhere. At the points of crossover, the distances between the adjacent or facing surfaces of the strips 12 and 70 are closer together where holes 60 were formed, and farther apart at the crossover points where no holes were formed. This variation in spacing affects the capacitance of the strip at the crossover points.

The strips 70 may be formed with enlarged areas or tabs 71 at the edges of the substrate to which they extend and these enlarged areas 71 may be used to facilitate terminal connections of the memory device to the apparatus with which it is being used. Similarly, the strips 12 may be provided with enlarged areas or tabs 72 at the edges of the substrate to which they extend. In the case of the strips 12, the enlarged areas or tabs 72 must be exposed by removal of portions of layer 16 and layer 69. Layer 16 may be removed from an area immediately adjacent to the end tabs 72 at the same time and by the same method that portions of the strips 12 are exposed in the holes 60, as illustrated in FIG. 14. The dielectric layer 69 may, on the other hand, be deposited on all areas of the substrate and layer 16 except in the areas immediately adjacent to and over tabs 72.

In this device, the strips 12 may be deemed as sense lines and the strips 70 address lines. In the specific example herein described, 100 address and 100 sense lines may be provided. These form 10,000 crossover points and consequently up to 10,000 bits for use as output words. Each intersection between an address line and a sense line thereby constitutes a storage position for one bit. To store a 1 the two lines at the intersection may be arranged to couple capacitively. To store a 0 the capacitance between the lines at the crossover point is kept as low as possible by not removing dielectric layer 16. A word may be read out by applying a pulse to the appropriate address line thereby causing a voltage to appear in the sense line to which it is coupled.

Greater noise protection in capacitive read-only memory devices is attained when the difference in capacitance between the "0" and "1" configuration is maximized. And since the preferred embodiment of this invention permits a greater differential in capacitance than heretofore possible, the noise protection is also significantly better. The geometric factors which control the capacitance are the electrode area and dielectric layer thickness at the crossover points. Increasing the electrode area, as has apparently been attempted (see U.S. Patent 3,183,490 issued May 11, 1965), to maximize capacitance limits the bits of information attainable in a memory matrix per unit area. But in the present invention the dielectric thickness is varied to provide a more significant relative difference between the "0" and "1" capacitance than is possible using electrode area variations. For example, the silicon dioxide layer for the "0" may be made 2 microns thick while the "1" crossover may be as thin as 0.1 micron. Thus the capacitance ratio may be as great as 20:1. On the other hand, such a differential using variations in electrode area would require unreasonable enlargements of the matrix.

In addition to the foregoing advantages, the present invention in its preferred form utilizing thin film dielectric layers permits high capacitances well above any stray capacitance. Prior art devices are ordinarily incapable of providing such high capacitance as the dielectric layer functions in those cases as a supporting medium and consequently have to be thick in order to provide structural strength. Well-known techniques for hole formation and photoresist processing referred to above are more fully described in a number of available papers including but not limited to: Atalla, M. M. "Semiconductor Surfaces and Films; Si-$SiO_2$ Systems," Monograph 3675 Bell Telephone System Technical Publication (August 1959). "Kodak Photosensitive Resists for Industry," Kodak Publication No. P–7. "Application and Processing of the Photo-Resist," Chapter 5—"Etching Techniques," Transistor Technology, vol. III, F. J. Biondi, D. Van Nostrand Co., Inc. (1958).

The construction and method herein described is illustrative only of the invention which may be used in connection with the fabrication and design of more sophisticated memory devices. For example, the invention herein described may be used to form a four-wire system utilizing balancing lines for the purpose of eliminating or improving the electrical characteristics of the lines and the 1:0 ratios, and also to minimize coupling between the sense lines. A device of this nature is described in "Analysis Sneak Paths and Sense-Line Distortion in an Improved Capacitor Read-Only Memory" by D. M. Taub.

While the foregoing is a preferred embodiment, the invention also contemplates a method illustrated in connection with FIGS. 21 and 22.

In this arrangement a card 80 is provided with a plurality of marking locating the relative positions of crossover points in the memory matrix to be formed. The card 80 should be stiff, dimensionally rigid, and be of convenient size to facilitate marking by hand as hereafter described. Thus, for example, the card may have a size of 10" x 10". The marking 81 corresponds in relative location and number to the crossover points. Thus, if there are 10,000 crossover points, the card will be formed with 100 row and 100 columns of uniformly spaced circles. These circles in this example may have a center to center spacing of 0.01" and a diameter of approximately 0.005" to 0.0075". Preferably, the line defining the individual circles should be heavy.

These cards 80 are marked with black magnetic ink at the crossover points at which capacitive coupling is desired. Care must be taken to fill in the circle completely but not to extend the magnetic marking beyond the edge of the circle. Thus, a heavy line defining the edge of the circle is desired. When the desired markings are placed upon the card, the card is mated to a perforated white or colored mask 83 having apertures 84 corresponding in location, size and number to the circles. The card 80 is then photographed through the facing mask 83 by a reduction camera, preferably capable of at least a 10× reduction to produce a glass photoemulsion plate of the type to which previously reference was made. This plate is then further processed as plate 42.

What is claimed is:

1. In a method of making a memory device having sensing and address lines spaced by a dielectric means and forming a plurality of crossover points defining memory bits in a binary system, the steps comprising:
- marking a sheet to indicate thereon relative locations of different binary words,
- using said sheet to form a plate having smaller corresponding dimensions with corresponding markings of correspondingly reduced size and spacing,
- using said plate to vary the parameters of said dielectric means at selected locations adjacent selected ones of said lines during the fabrication of said device, and
- thereafter forming additional lines on said partially fabricated device with said additional lines extendng across said selected locations to form crossover points.

2. A method as set forth in claim 1 wherein said plate is a photographic plate with said markings having light transmitting qualities differing from other portions of said plate, and said partially fabricated device is formed with a light-sensitive film, the steps of projecting a light through said plate onto said film whereby a first portion of said film is developed and a second portion remains undeveloped, and thereafter removing one of said portions and underlying dielectric material to vary the parameter of said dielectric means.

3. A method as set forth in claim 2 wherein said sheet is marked with magnetic ink, and
- said plate is formed by mating said marked sheet to a dielectric board having perforations corresponding in relative location to said locations, positioning a plurality of magnets on said board and causing said magnets to fall into and remain in those perforations adjacent marks on said sheet, and thereafter photographing said board with a reduction camera to form said plate with markings of light-transmitting qualities contrasting to other portions of said board.

4. A method as set forth in claim 3 wherein said magnets are of a color contrasting to said board.

5. A method as set forth in claim 1 wherein said marked sheet is photographed with a reduction camera to form said plate with markings of light-transmitting qualities contrasting to other portions of said board.

6. A method as set forth in claim 5 wherein said sheet is formed with a plurality of locations each defined by an enclosed line, including completely covering the selected locations to be marked with a marking means of contrasting color to the color of said sheet.

7. A method of making a memory device having sensing lines and address lines forming a plurality of crossover points in said device comprising:

marking a sheet of dielectric material having a plurality of selected locations on a surface of said sheet corresponding to said crossover points of said memory device being formed with magnetic ink marks at a first group of said selected locations at which a minimum capacitance is desired, arranging a dielectric board having beveled holes positioned to correspond with said selected locations above and in facing relation with said marked sheet whereby said marks will be exposed through selected ones of said holes, placing a plurality of magnets shaped and sized to fit into said beveled holes on the surface of said dielectric board remote from said sheet, vibrating said sheet and dielectric board to cause said magnets to fall into said holes whereby all said selected ones of said holes will be filled and thereafter removing from said dielectric board all magnets not located in said selected ones of said holes, photographically reducing and transferring the pattern formed by the other of said holes from said dielectric board containing magnets in said selected ones of said holes to a plate whereby spots on said plate corresponding in relative location to the other of said holes are light transmitting and the portions of said plate surrounding said holes are opaque, projecting light through said pattern onto the top surface of a member comprising a base layer of dielectric material, a plurality of elongated conductive members formed on sai dbase layer, a dielectric means of uniform thickness covering said conductive members and the surface of said base layer supporting said conductive members, and a layer of photoresist material covering said dielectric means and forming said top surface, whereby said photoresist material will be developed in the areas exposed to said projected light, removing said developed areas of said photoresist material and the portions of said dielectric means immediately underlying said developed areas and thereafter applying a dielectric film over said photoresist material and the means exposed on removal of said underlying portions whereby the overall dielectric thickness of said photoresist material, dielectric means and dielectric film is varied with the overall thickness of said removed portions being thinner, and thereafter forming a second set of elongated conductive members over said dielectric film extending angularly to said first-mentioned conductive members and crossing said first mentioned members at said thinner portions thereby forming crossover points having a greater capacitive coupling htan at other crossover points.

References Cited

UNITED STATES PATENTS

| | | | |
|---|---|---|---|
| 3,061,821 | 10/1962 | Gribble et al. | 340—174 |
| 3,077,021 | 2/1963 | Brownlow | 340—174 X |
| 3,214,273 | 10/1965 | Frantzen. | |
| 3,278,913 | 10/1966 | Raffel | 340—174 |
| 3,307,253 | 3/1967 | Wullenwaber | 29—433 |
| 3,129,494 | 4/1964 | Perkins | 29—203 |
| 3,183,579 | 5/1965 | Briggs et al. | 29—604 |

JOHN F. CAMPBELL, *Primary Examiner.*

D. C. REILEY, *Assistant Examiner.*